United States Patent
Mulligan

(10) Patent No.: US 11,679,826 B2
(45) Date of Patent: Jun. 20, 2023

(54) UNITARY LINK AND TRACK CHAIN ASSEMBLY OF A WORK VEHICLE

(71) Applicant: DEERE & COMPANY, Moline, IL (US)

(72) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 76 days.

(21) Appl. No.: 16/948,844

(22) Filed: Oct. 2, 2020

(65) Prior Publication Data

US 2022/0105999 A1  Apr. 7, 2022

(51) Int. Cl.
| | |
|---|---|
| *B62D 55/21* | (2006.01) |
| *B62D 55/06* | (2006.01) |
| *B62D 55/125* | (2006.01) |
| *B62D 55/092* | (2006.01) |
| *B62D 55/088* | (2006.01) |
| B62D 55/14 | (2006.01) |

(52) U.S. Cl.
CPC ............. *B62D 55/21* (2013.01); *B62D 55/06* (2013.01); *B62D 55/092* (2013.01); *B62D 55/125* (2013.01); *B62D 55/0887* (2013.01); *B62D 55/14* (2013.01)

(58) Field of Classification Search
CPC ........ B62D 55/08; B62D 55/18; B62D 55/20; B62D 55/205; B62D 55/21; B62D 55/211; B62D 55/213; B62D 55/06; B62D 55/092; B62D 55/125; B62D 55/0887; B62D 55/14
See application file for complete search history.

(56) References Cited

U.S. PATENT DOCUMENTS

| | | | |
|---|---|---|---|
| 2,387,387 A | 10/1945 | Garber | |
| 3,815,962 A * | 6/1974 | Stedman | B62D 55/20 305/201 |
| 8,113,597 B2 | 2/2012 | Grenzi | |
| 2010/0148575 A1 | 6/2010 | Johannsen et al. | |
| 2012/0102791 A1 | 5/2012 | Cooper et al. | |
| 2012/0119567 A1 | 5/2012 | Johannsen et al. | |
| 2012/0121320 A1 * | 5/2012 | Abello | B62D 55/205 29/426.1 |
| 2014/0001822 A1 * | 1/2014 | Thorson | B62D 55/21 305/124 |
| 2014/0001824 A1 | 1/2014 | Meyer et al. | |
| 2020/0062323 A1 * | 2/2020 | Herbers | B62D 55/213 |
| 2020/0122792 A1 * | 4/2020 | Lian | B62D 55/0887 |

FOREIGN PATENT DOCUMENTS

KR  20100099848 A  9/2010

OTHER PUBLICATIONS

German Search Report issued in application No. DE102021209347.7 dated Apr. 27, 2022 (11 pages).
Ehrlenspiel, K., Lecture on machine elements I. Reprint 5th chair for design in mechanical engineering, Technical University of Munich, 1992.

* cited by examiner

*Primary Examiner* — Minnah L Seoh
*Assistant Examiner* — Abigail R Hymel

(57) ABSTRACT

In accordance with the present disclosure, a track chain assembly for a work vehicle may comprise of a link set, a unitary link, and a bushing assembly. The link set may include a first link and a second link. The unitary link may include a single link. The bushing assembly may couple the link set and the unitary link for relative rotation between the link set and the unitary link.

16 Claims, 7 Drawing Sheets

UNITARY LINK AND TRACK CHAIN ASSEMBLY OF A WORK VEHICLE

TECHNICAL FIELD

The present disclosure generally relates to a unitary link and track chain assembly of a work vehicle.

BACKGROUND

Work vehicles, such as construction, forestry, agricultural or mining work vehicles, typically are propelled across the ground using wheels or a track chain. Track chain type work vehicles may include a heavy elastomeric track chain or a steel track chain. A work vehicle with a track chain vehicle may typically include an undercarriage with a track chain that is carried by a plurality of sprockets and rollers. The track chain in turn includes several interconnecting links, with each link carrying a corresponding shoe that extends crossways to the travel direction of the work vehicle. The interconnecting links are coupled to one another by bushing assemblies. In traditional track chains, each section or chain assembly is retained by press fits between the outer links (i.e. opposing ends) and the pin, and press fits between inner links and the opposing ends of the bushings. This results in a continuously uniform chain with high torsional rigidity. In this configuration, the bushing does not rotate between links. Because of their structure, traditional track chain assemblies are inherently hi-impact tolerant by nature, tolerating both low impact scenes and high impact scenes well. However, also because of the high torsional rigidity, the working life of a traditional track chain assembly remains relatively short at about 4000 hours. The short working life results in frequent replacement of each track chains assembly to extend the working life.

The industry has attempted to resolve this by introducing rotating bushing chains, where bushings rotate relative to the links (instead of press fitted to links). However, because the immovable bushing-linkage coupling found in traditional track chains are no longer present, the torsional rigidity is significantly reduced. This reduction in torsional rigidity significantly reduces the working life, but also make it more susceptible to seal leakage and dry joints, and can be used in only low impact applications.

Traditional track chains are high impact tolerant, but since not equipped with a rotating bushing, have a shorter working life. Rotating bushing chains have a long working life but are only low impact tolerant. Therein lies a need, for a track that is high impact tolerant with a long working bushing life.

SUMMARY

Various aspects of examples of the present disclosure are set out in the claims.

According to an aspect of the present disclosure, a track chain assembly may include a link set, and a unitary link. The link set may include a first link and a second link. The unitary link may include a single link. The bushing assembly may couple the link set and the unitary link for relative rotation between the link set and the unitary link. The first link may be coupled to a left portion of the unitary link and the second link may be coupled to a right portion of the unitary link. The unitary link may comprise of a left portion, a right portion, and a connecting portion straddling the left portion and the right portion.

The bushing assembly may comprise of a pin defining a longitudinal axis and having a lubricant reservoir. The pin may also include first and second opposing ends. The bushing assembly may also include a left inner collar, a right inner collar, a left outer collar, and a right outer collar. The left inner collar may be coupled to the left portion of the unitary link. The right inner collar may be coupled to the right portion of the unitary link. Both the left inner collar and the right inner collar may include a first aperture for rotatably accommodating the pin. The left outer collar may be coupled to the first link of the link set. The right outer collar may be coupled to the second link of the link set. The left outer collar and the right outer collar may include a second aperture for immovably accommodating a pin.

The left inner collar and the right inner collar each include a groove along an outer surface of the left inner collar and the right inner collar wherein the groove may accommodate a reinforcement clip.

The reinforcement clip may comprise of a locking ring wherein the locking ring may engage the unitary link.

The left outer collar and the right outer collar may each include a groove along an outer surface of the left outer collar and the right outer collar wherein the groove may accommodate a reinforcement clip.

The reinforcement clip may comprise of a locking ring wherein the locking ring may engage one or more of the left outer collar and the right outer collar.

The cross-sectional diameter of the right inner collar may be greater than the cross-sectional diameter of the left inner collar.

The cross-sectional diameter of the through-hole of the right portion of the unitary link may be greater than the cross-sectional diameter of the through-hole of the left portion of the unitary link The above and other features will become apparent from the following description and accompanying drawings.

BRIEF DESCRIPTION OF THE DRAWINGS

The detailed description of the drawings refers to the accompanying figures in which.

DETAILED DESCRIPTION

At least one exemplary embodiment of the subject matter of this disclosure is understood by referring to FIGS. 1 through 8 of the drawings.

As used herein, unless otherwise limited or modified, lists with elements that are separated by conjunctive terms (e.g.

"and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g. A and B; B and C; A and C; or A, B, and C).

Figure 1:
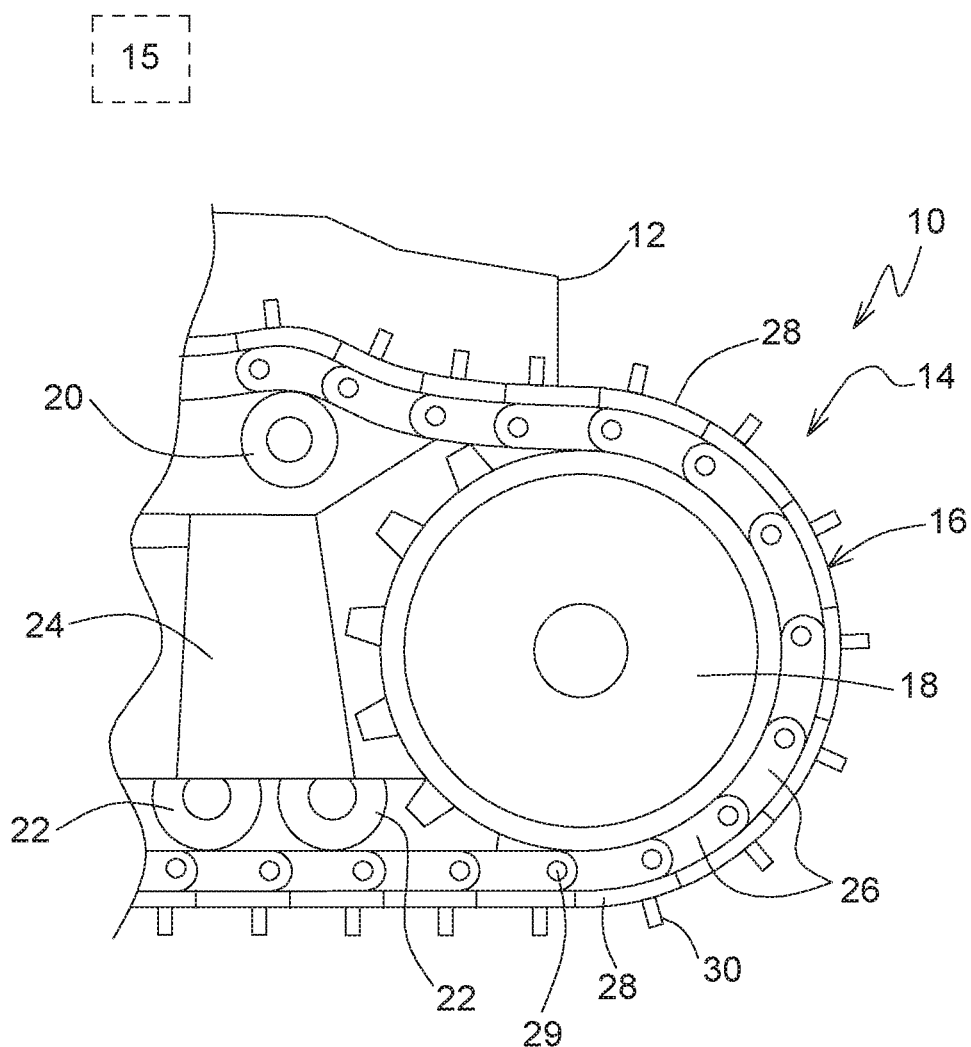
FIG. 1 is a side view of a portion of a work vehicle including an embodiment of a track chain assembly of the present invention.

Referring now to FIGS. 1-4, and more particularly to FIG. 1, there is shown a portion of a work vehicle 10 including an embodiment of a track chain assembly 16. In the illustrated embodiment, work vehicle 10 is in the form of a crawler dozer, including a frame 12 carrying an undercarriage 14. However, other types of work vehicles including track chain assemblies, such as loaders, excavators, tractors, etc. and any such work vehicle including a track chain for propulsion is herein considered to be an embodiment of a work vehicle 12. The work vehicle 10 may include a prime mover 15 coupled to the sprocket and for moving the track chain assemblies.

Undercarriage 14 generally includes a track chain assembly 26 which is carried by a plurality of rollers and sprockets, such as rear drive roller/sprocket 18, idler roller 20 and a plurality of track rollers 22 carried by a track frame 24. Undercarriage 14 may include other rollers and sprockets, not shown, such a front idler roller, etc. The track chain 16 may include a plurality of track chain assemblies 16, each of which may be coupled with and carry a corresponding shoe 28, such as by using bolts 29. Each shoe 28 may have a corresponding shape, depending on the particular application of the work vehicle 10. For example, each shoe 28 may include a cleat or grouser 30 with a desired shape to provide additional traction with the soil.

Figure 2:
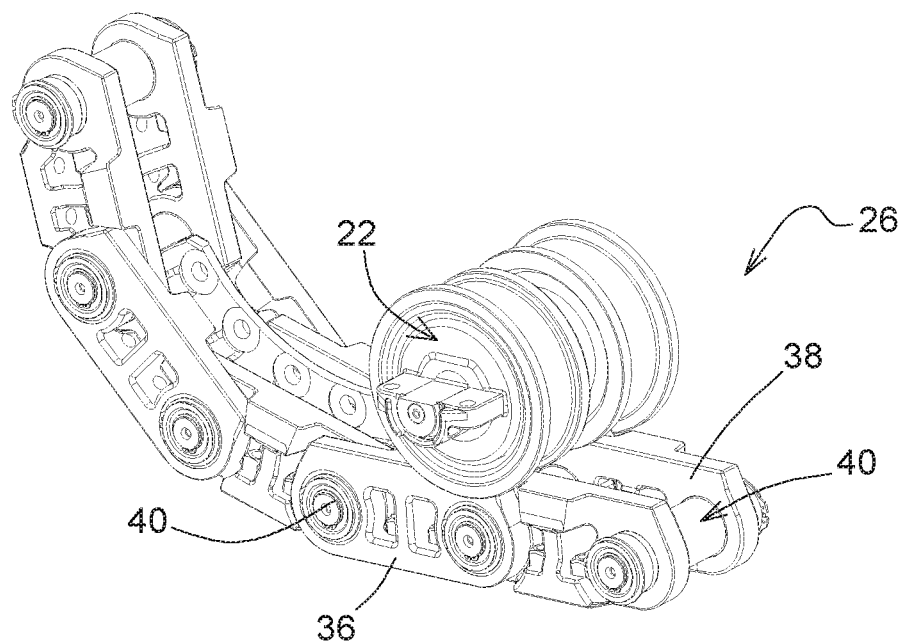
FIG. 2 is a perspective view of a portion of a work vehicle including an embodiment of a track chain assembly.
Figure 3:
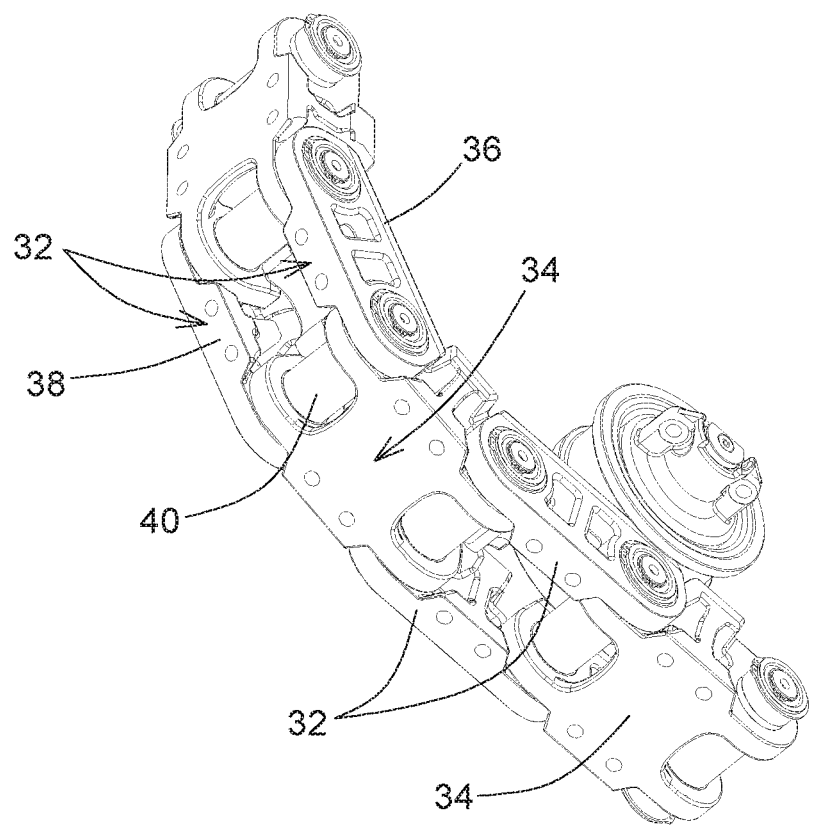
FIG. 3 is a perspective bottom view of a portion of the work vehicle of the embodiment shown in FIG. 2.
Figure 4:
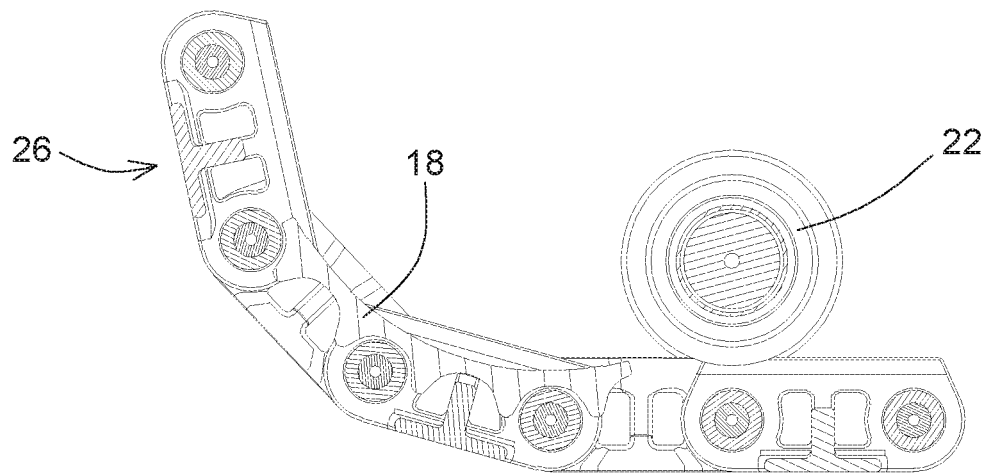
FIG. 4 is a side sectional view of a portion of a work vehicle of the embodiment shown in FIG. 2.

FIGS. 2 and 3 are perspective views of a portion of a work vehicle 10 comprising an embodiment of a track chain assembly 26 in greater detail, wherein FIG. 2 is a top perspective view of some track chain assemblies 26 and FIG. 3 is a bottom perspective view of track chain assemblies 26. The track chain assembly 26 comprises a link set 32, a unitary link 34, and the bushing assembly 40 coupling the link set 32 and the unitary link 34 for relative rotation between the link set 32 and the unitary link 34. The link set 32 may comprise a first link 36 and a second link 38. The unitary link 34 may comprise of a single link. The unitary link 34 is shown as a single-piece component. However, an alternative embodiment may comprise of multiple portions immovably coupled to create a single piece component, thereby functioning as a single-piece component. The unitary link 34 (also shown in FIGS. 7A-7B) may comprise of a left portion 58, a right portion 60, and a connecting portion 62 straddling the left portion 58 and the right portion 60. The track chain assembly 26 in the present embodiment alternates between the link set 32 and the unitary link 34. The coupling of a link set 32 with a unitary link 34 advantageously provides a track chain with high impact tolerance (like a traditional chain assembly), but with a longer working life (like a rotating bushing chain assembly).

In an alternate configuration, it may be contemplated that a track chain assembly may comprise of a link set, another link set, and a unitary link 34 wherein the unitary link 34 occurs as every third link as it alternates with the link set 32. In either embodiment, the frequency of the unitary link 34 in a track chain assembly 26 advantageously increases torsional rigidity of the track chain assembly while improving the working life, but in differing degrees contingent upon the frequency of unitary links 34 in a track chain assembly loop. The first link 36 of the link set 32 may be coupled to the left portion 58 of the unitary link 34 and the second link 38 of the link set 32 may be coupled to the right portion 60 of the unitary link 34. Although one configuration is shown, an alternative embodiment may comprise of the left portion 58 and the right portion 60 positioned outward of the first link 36 and the second link 38, respectively.

Figure 5:
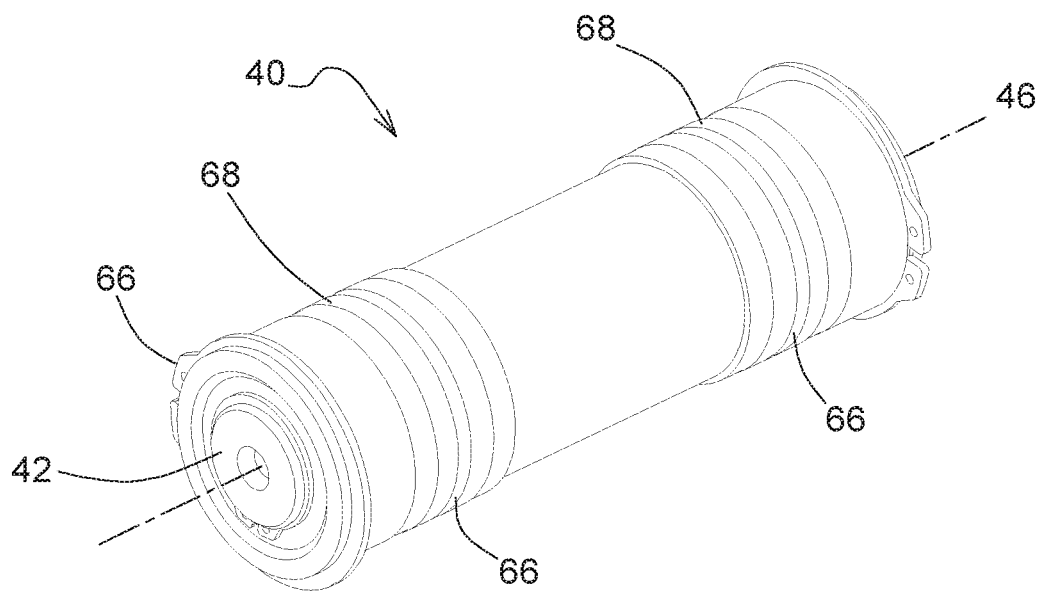
FIG. 5 is a perspective view of a bushing assembly portion of the embodiment shown in FIG. 2.
Figure 6:
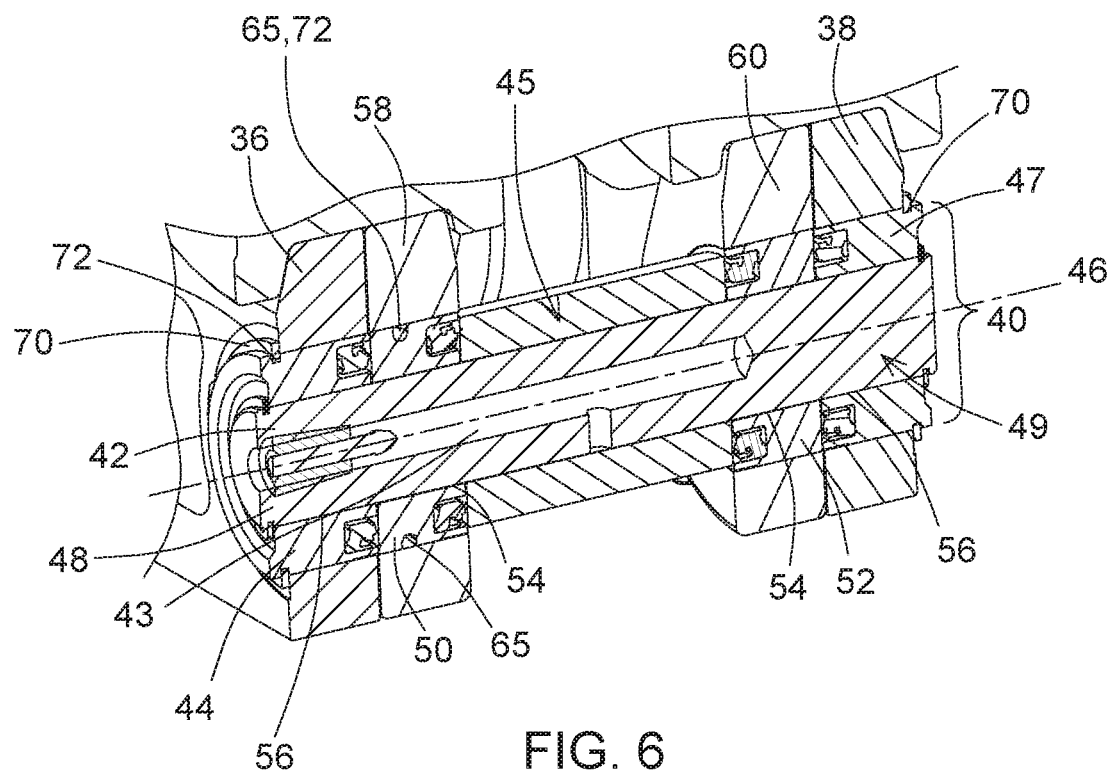
FIG. 6 is a cross-sectional view of the bushing assembly shown in FIG. 5.
Figure 7A:
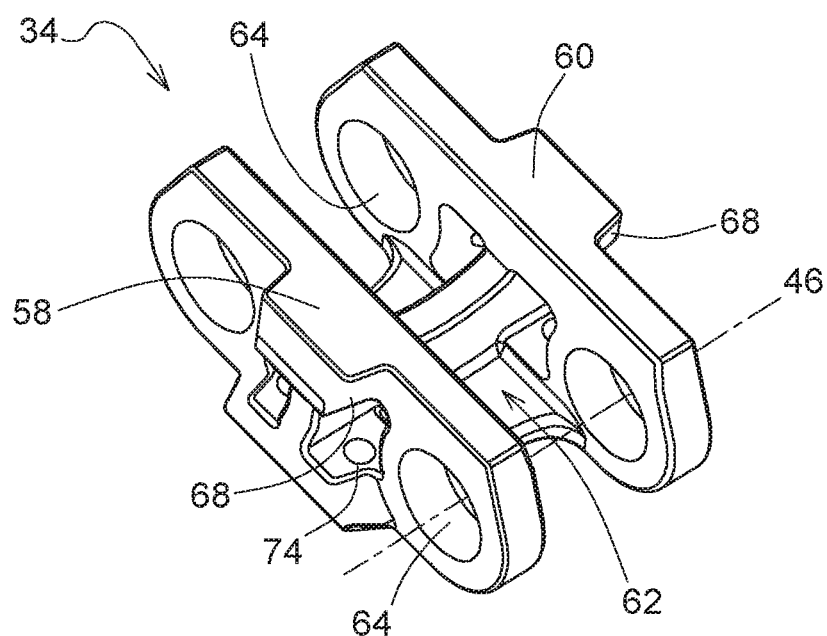
FIG. 7*a* is a top perspective view of a unitary link portion of the embodiment shown in FIG. 2.
Figure 6:
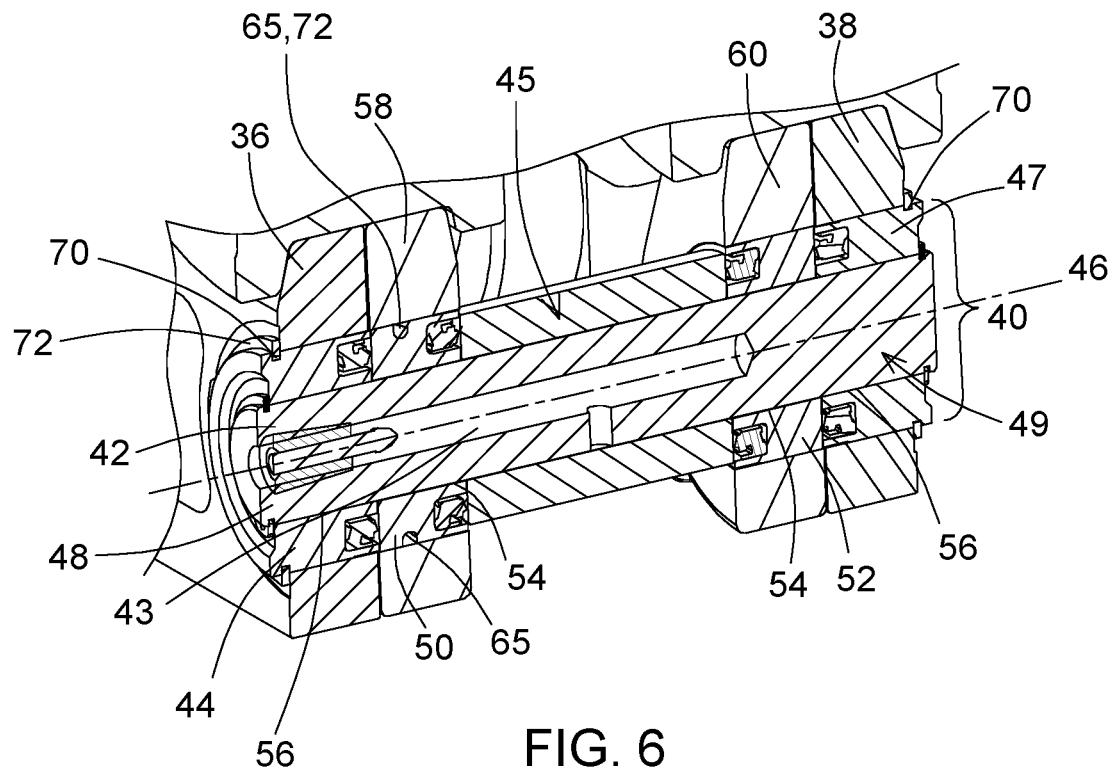
Figure 7A:
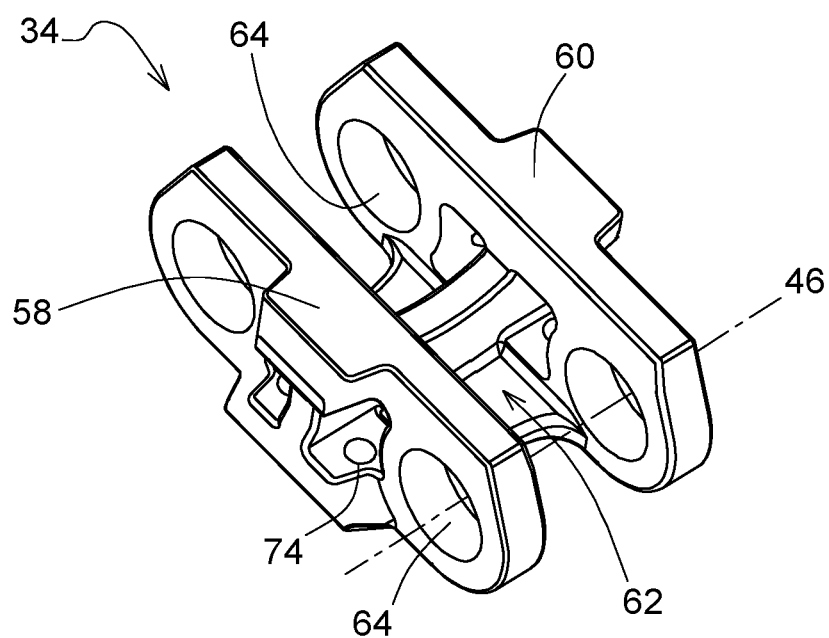
Figure 7B:
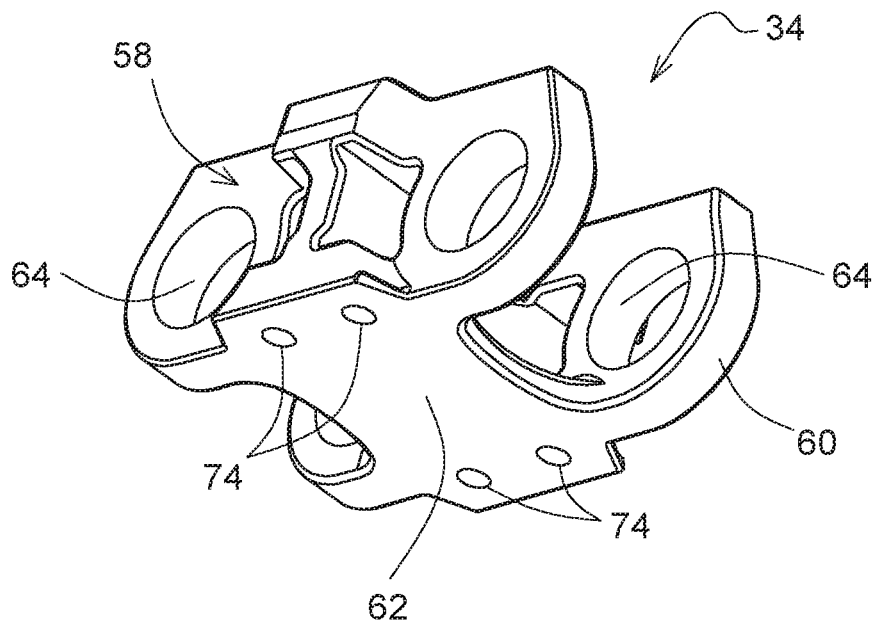
FIG. 7*b* is a bottom perspective view of a unitary link portion of the embodiment shown in FIG. 2.
Figure 8:
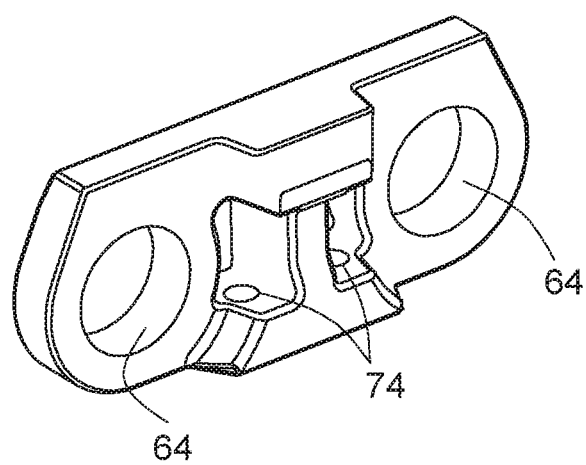
FIG. 8 is a perspective view a link from the link set of the embodiment shown in FIG. 2.

Now turning to FIGS. 5-6 with continued reference to FIGS. 2-3, the bushing assembly 40 may comprise of a pin 42 defining a longitudinal axis 46, and the pin 42 having a lubricant reservoir 43. The lubricant reservoir 43 provides a clearance for a lubricant to reduce wear between moving components of the track chain assembly 26, particularly the unitary link 34 and the pin 42. The lubricant may be retained by seals positioned accordingly. The pin 42 including a first 48 and second opposing end 49 extends through the length of the bushing assembly 40. Lubricant is all internal within the bushing assembly 40.

A left inner collar 50 may be coupled to the left portion 58 of the unitary link 34, a right inner collar 52 may be coupled to the right portion 60 of the unitary link 34. The left inner 50 collar and the right inner collar 52 may include a first aperture 54 for rotatably accommodating the pin 42. A left outer collar 44 may be coupled to the first link 36 of the link set 32 and a right outer collar 47 may be coupled to the second link 38 of the link set 32, wherein the left outer collar 44 and the right outer collar 47 include a second aperture 56 for immovably accommodating the pin 42 (contrary to first apertures 54 of left inner collar 50 and right inner collar 52). In the present exemplary embodiment, the left outer collar 44 and the right outer collar 47 of the bushing assembly 40 are also immovably coupled to the link set 32 through a press fit assembly. However, other means of immovable couplings may be contemplated (e.g. welds, adhesive, to name a few).

The left inner collar 50 and the right inner collar 52 of the bushing assembly 40 may be immovably coupled to the unitary link 34 via through-holes 64, for example, a press fit. However, the left inner collar 50 and the right inner collar 52 may enable the pin 42 to freely rotate within first apertures 54.

A bushing 45 may be positioned between the left portion 58 or the unitary link 34 and the right portion of the unitary link 34. The bushing 45 includes an aperture to accommodate the pin 42 and may also freely rotate about the pin 42 without being immovably coupled to a link (as found in traditional track chains). The bushings 45 serve as a spacer between first links 36 and second links 38.

The left inner collar 50 and the right inner collar 47 of the bushing assembly 40 may each include a groove 65 along the outer surface of the left inner collar 50 and the right inner collar 47. The groove 65 may accommodate a reinforcement clip 66. In one embodiment, the reinforcement clip 66 may comprise of a locking ring 72 wherein each of the locking rings increases the frictional engagement of the unitary link 34 with the left inner collar 50 and the right inner collar 47.

The left outer collar 44 and the right outer collar 47 of bushing assembly 40 may each include a second groove 70 along an outer surface 68 of the left outer collar 44 and the right outer collar 44. The second groove 70 may also accommodate a reinforcement clip 66.

The reinforcement clip 66 may comprise of a locking ring 72, wherein each of the locking rings 72 engage one or more of the left outer collar 44, the right outer collar 47, the left inner collar 50 and right inner collar 52. Inclusion of the reinforcement clips 66 coupled to the outer collar (44, 47 or both) and the secondary reinforcement to the inner collar (50, 52 or both) advantageously reduces the possibility of link walking, thereby increasing the life use of a track chain assembly 26. Link walking may be defined as the links of track chain assembly disengage, and the links "walk" away. Link walking may result in seal breaks wherein lubrication leaks, thereby causing massive internal wear.

Figure 9:
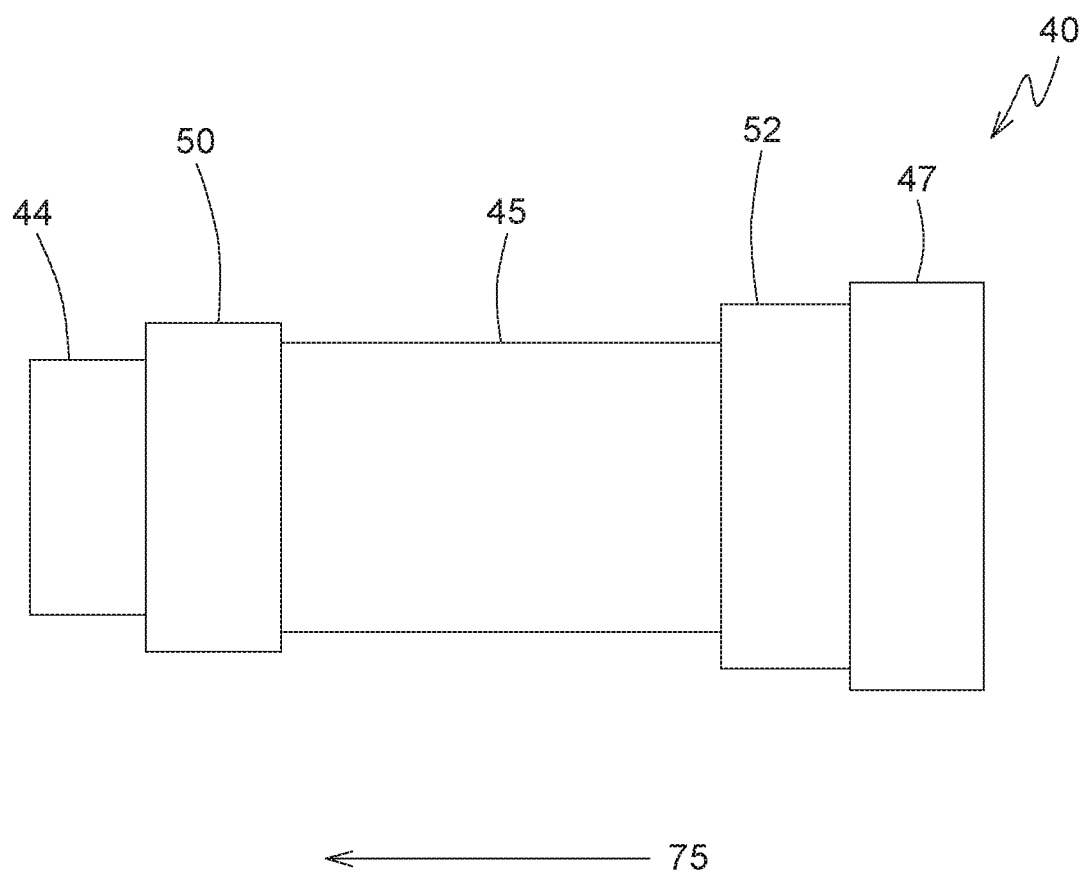
FIG. 9 is a schematic cross-section of a bushing assembly.

Now turning to FIG. 9, a schematic representing the cross-section of the bushing assembly 40 is shown. The stepping (shown in exaggerated form) of the cross-sectional diameter of the collars (44, 47, 50, 52) advantageously enables ease of assembly by inserting the bushing assembly 40 through links (32, 34) in a single direction (as shown by arrow). In the track chain assembly 26, the link set 32 and the unitary link 34 align along the longitudinal axis. The bushing assembly 40 is generally preassembled prior to coupling with the link set 32 and the unitary link 34. The track chain assembly 26 of the bushing assembly 40, the link set 32 and unitary link 34 may follow a sequential order of assembly. In one embodiment, for example, the track chain assembly 26 may be assembled as follows: first link 36 of the link set 32 coupled to the left outer collar 44 of the bushing assembly 40, the left portion of the unitary link 58 coupled to the left inner collar 50 of the bushing assembly 40, the right portion of the unitary link 60 coupled to the right inner collar 52 of the bushing assembly 40, and the second link 36 of the link set 32 coupled with the right outer collar 47 of the bushing assembly 40. The cross-sectional diameter of the left outer collar is less than the left inner collar. The cross-section diameter of the left inner collar is less than the right inner collar. The cross-sectional diameter of the right inner collar is less than the right outer collar. The central portion between the left inner collar and the right inner collar represent the bushing. In another similar embodiment (not shown), the sequence may be reversed wherein the cross-sectional diameter of the left inner collar 50 is greater than the cross-sectional diameter of the right inner collar 52. The cross-sectional diameter of the right inner collar is greater than the right outer collar. The cross-sectional diameter of the left outer collar is greater than the left inner collar. Providing the stepped difference between cross-sections advantageously eases assembly and prevents the possibility of the link set 32 and the unitary link 34 from scoring the outer surface 68 of collars (44, 47, 50, 52).

Correspondingly, to couple with bushing assembly 40 shown in FIG. 9, the cross-sectional diameter of the through-hole 64 each respective link or link portion is also stepped. That is, corresponding to FIG. 9, the cross-sectional diameter of the through-hole 64 of the right portion 60 of the unitary link may be greater than the cross-sectional diameter of the through-hole 64 of the left portion 58 of the unitary link 34. The cross-sectional diameter of the through-hole 64 of the second link 38 of the link set 34 may be greater than the cross-sectional diameter of the through-hole 64 of the through-hole of the right portion 60 of the unitary link 34; and the cross-sectional diameter of the through-hole 64 of the first link 36 of the link set 32 may be greater than the cross-sectional diameter of the through-hole 64 of the left portion 58 of the unitary link 34. Again, this advantageously improves ease of assembly when the components are sequentially assembled by reducing the possibility of scoring the outer surface 68 of the collars (44, 47, 50, 52) when assembling in a single direction (as shown by arrow 75).

Both the unitary link 34 and the link set 32 may each comprise at least one opening 74 for accommodating a bolt (not shown). These openings 74 may be used to securely couple the track chain assembly 26.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A track chain assembly for a work vehicle, the track chain assembly comprising:
    a link set and a unitary link, the link set including a first link and a second link, the unitary link including a single link; and
    a bushing assembly coupling the link set and the unitary link for relative rotation between the link set and the unitary link, wherein the bushing assembly comprises
        a pin defining a longitudinal axis, and having a lubricant reservoir, the pin including a first and a second opposing ends;
        a left inner collar coupled to a left portion of the unitary link, a right inner collar coupled to a right portion of the unitary link, wherein the left inner collar and the right inner collar include a first channel for rotatably accommodating the pin, wherein a cross-sectional diameter of the right inner collar is greater than a cross-sectional diameter of the left inner collar; and
        a left outer collar coupled to the first link of the link set, a right outer collar coupled to the second link of the link set, wherein the left outer collar and the right outer collar include a second channel for immovably accommodating the pin.

2. The track chain assembly of claim 1, wherein the first link is coupled to a left portion of the unitary link and the second link is coupled to a right portion of the unitary link.

3. The track chain assembly of claim 2, wherein the unitary link comprises the left portion, the right portion, and a connecting portion straddling the left portion and the right portion.

4. The track chain assembly of claim 1, wherein the left inner collar and the right inner collar each include a groove along an outer surface of the left inner collar and the right inner collar, the groove accommodating a reinforcement clip.

5. The track chain assembly of claim 4, wherein the reinforcement clip comprises a locking ring, the locking ring engaging one or more of the left outer collar and the right outer collar.

6. The track chain assembly of claim 4, wherein the reinforcement clip comprises a locking ring, the locking ring engaging the unitary link.

7. The track chain assembly of claim 1, wherein the left outer collar and the right outer collar each include a groove along an outer surface of the left outer collar and the right outer collar, the groove accommodating a reinforcement clip.

8. A track chain assembly for a work vehicle, the track chain assembly comprising:
    a link set and a unitary link, the link set including a first link and a second link, the unitary link including a single link; and a bushing assembly coupling the link set and the unitary link for relative rotation between the link set and the unitary link, the bushing assembly comprising:
- a pin defining a longitudinal axis, and having a lubricant reservoir, the pin including a first and a second opposing ends;
- a left inner collar coupled to a left portion of the unitary link, a right inner collar coupled to a right portion of the unitary link, wherein the left inner collar and the right inner collar include a first channel for rotatably accommodating the pin; and
- a left outer collar coupled to the first link of the link set, a right outer collar coupled to the second link of the link set, wherein the left outer collar and the right outer collar include a second channel for immovably accommodating the pin;
- wherein a cross-sectional diameter of a through-hole of the right portion of the unitary link is greater than a cross-sectional diameter of a through-hole of the left portion of the unitary link.

9. A work vehicle comprising:
a prime mover;
a frame supporting the prime mover;
a sprocket coupled to the frame;
a plurality of track chain assemblies coupled to the sprocket and moved by the prime mover;
at least one of the track chain assembly comprising:
- a link set and a unitary link, the link set including a first link and a second link, the unitary link including a single link; and
- a bushing assembly coupling the link set and the unitary link for relative rotation between the link set and the unitary link, wherein the bushing assembly comprises:
  - a pin defining a longitudinal axis, and having a lubricant reservoir, the pin including a first and second opposing ends;
  - a left inner collar coupled to the left portion of the unitary link, a right inner collar coupled to the right portion of the unitary link, wherein the left inner collar and the right inner collar include a first channel for rotatably accommodating the pin;
  - a left outer collar coupled to the first link of the link set, a right outer collar coupled to the second link of the link set, wherein the left outer collar and the right outer collar include a second channel for immovably accommodating the pin,
  - wherein a cross-sectional diameter of a through-hole of the right portion of the unitary link is greater than a cross-sectional diameter of a through-hole of the left portion of the unitary link.

10. The track chain assembly of claim 9, wherein the first link is coupled to a left portion of the unitary link and the second link is coupled to a right portion of the unitary link.

11. The track chain assembly of claim 10, wherein the unitary link comprises the left portion, the right portion, and a connecting portion straddling the left portion and the right portion.

12. The track chain assembly of claim 9 wherein the left inner collar and the right inner collar each include a groove along an outer surface of the left inner collar and the right inner collar, the groove accommodating a reinforcement clip.

13. The track chain assembly of claim 12, wherein the reinforcement clip comprises a locking ring, the locking ring engaging the unitary link.

14. The track chain assembly of claim 12, wherein the reinforcement clip comprises a locking ring, the locking ring engaging one or more of the left outer collar and the right outer collar.

15. The track chain assembly of claim 9, wherein the left outer collar and the right outer collar each include a groove along an outer surface of the left outer collar and the right outer collar, the groove accommodating a reinforcement clip.

16. The track chain assembly of claim 9, wherein a cross-sectional diameter of the right inner collar is greater than a cross-sectional diameter of the left inner collar.

\* \* \* \* \*